US008162507B2

(12) United States Patent
Inaba

(10) Patent No.: US 8,162,507 B2
(45) Date of Patent: Apr. 24, 2012

(54) LAMP UNIT HAVING A PARABOLA OPTICAL SYSTEM REFLECTOR

(75) Inventor: Tetsuaki Inaba, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 406 days.

(21) Appl. No.: 12/482,155

(22) Filed: Jun. 10, 2009

(65) Prior Publication Data

US 2009/0310353 A1 Dec. 17, 2009

(30) Foreign Application Priority Data

Jun. 17, 2008 (JP) ................................ 2008-157548

(51) Int. Cl.
*F21V 13/04* (2006.01)
*B60Q 1/04* (2006.01)

(52) U.S. Cl. ......... 362/243; 362/328; 362/520; 362/545

(58) Field of Classification Search .................. 362/243, 362/245, 326, 328, 335, 520, 538, 539, 543–545
See application file for complete search history.

(56) References Cited

U.S. PATENT DOCUMENTS 1,702,429 A * 2/1929 Donley ........................ 362/243
6,776,513 B2 * 8/2004 Albou ........................... 362/243
6,821,008 B2 * 11/2004 Tokoro et al. ................. 362/539
7,097,334 B2 * 8/2006 Ishida et al. .................. 362/245
7,665,872 B2 * 2/2010 Nakabayashi ................ 362/538
2005/0180158 A1 * 8/2005 Komatsu ....................... 362/545

FOREIGN PATENT DOCUMENTS

JP 2006-134810 A 5/2006

OTHER PUBLICATIONS

English abstract for Japanese Publication No. 2006-134810, publication date May 25, 2006, esp@cenet database, (1 page).

* cited by examiner

*Primary Examiner* — Alan Cariaso
(74) *Attorney, Agent, or Firm* — Osha • Liang LLP

(57) ABSTRACT

A lamp unit includes a first light source; a projection lens that forms a light distribution pattern using light radiated from the first light source; a second light source; and a parabola optical system reflector that reflects light radiated from the second light source. The projection lens has a paraxial outer peripheral portion that is closer to a first optical axis than at least part of another outer peripheral portion as seen in the direction of the first optical axis. The parabola optical system reflector reflects light radiated from the second light source such that the reflected light passes through a space adjacent to the paraxial outer peripheral portion.

10 Claims, 5 Drawing Sheets

P–P

LAMP UNIT HAVING A PARABOLA OPTICAL SYSTEM REFLECTOR

BACKGROUND OF INVENTION

1. Field of the Invention

The present invention relates to a lamp unit.

2. Related Art

Conventionally known optical systems include a projector optical system that forms a projection image by projection light radiated from a light source through a projection lens and a parabola optical system that radiates unchanged light that was emitted from a light source and reflected by a reflector. In such case, a vehicular lamp has been proposed that combines a projector optical system that radiates a hot zone light distribution and a parabola optical system that radiates a diffusion light distribution (see Patent Document 1, for example).

[Patent Document 1] Japanese Patent Application Laid-Open (Kokai) No. 2006-134810

SUMMARY OF INVENTION

When configuring a lamp unit that combines a projector optical system and a parabola optical system in this manner, there is a risk of the lamp unit increasing in size due to the components that structure the respective optical systems. In light of this risk, suppressing an increase in the space occupied by the lamp unit in order to effectively utilize the space inside a vehicle or the like is becoming an important issue.

In view of the above, one or more embodiments of the present invention provide a lamp unit that combines a projector optical system and a parabola optical system while suppressing an increase in overall size.

A lamp unit according to one or more embodiments of the present invention includes a first light source; a projection lens that forms a light distribution pattern using light radiated from the first light source; a second light source; and a parabola optical system reflector that reflects light radiated from the second light source. The projection lens has a paraxial outer peripheral portion that is closer to a first optical axis than at least part of another outer peripheral portion as seen in the direction of the first optical axis. The parabola optical system reflector reflects light radiated from the second light source such that the reflected light passes through a space adjacent to the paraxial outer peripheral portion.

According to this aspect, the space in the vicinity of the paraxial outer peripheral portion of the projection lens can be utilized as a light path of the parabola optical system. Therefore, the light path of the parabola optical system can thus approach the optical axis of the projection lens more closely than the light path of a parabola optical system that utilizes the vicinity of a projection lens whose outer periphery is a circle as seen along the optical axis, for example. Accordingly, an overall size of the lamp unit can be suppressed by combining the projector optical system and the parabola optical system.

The lamp unit may further include a projector optical system reflector that reflects light radiated from the first light source toward the projection lens; and a heat sink. The first light source may have a first semiconductor light-emitting element. The second light source may have a second semiconductor light-emitting element. The parabola optical system reflector and the projection optical system reflector may be disposed at a position in the same peripheral direction as the paraxial outer peripheral portion with respect to the first optical axis. The first semiconductor light-emitting element and the second semiconductor light-emitting element may be attached to an outer face of the heat sink that faces one of the parabola optical system reflector and the projector optical system reflector.

According to this aspect, the first semiconductor light-emitting element and the second semiconductor light-emitting element can be attached facing in the same direction to the outer face of the heat sink. Therefore, more parts usable for radiation can be provided on the heat sink than when a plurality of semiconductor light-emitting elements is faced in different directions and respectively attached to the outer face, and the radiation efficiency of the heat sink can be improved.

The projector optical system reflector may be disposed at a position closer to the first optical axis than the parabola optical system reflector. According to this aspect, in comparison to disposing the projector optical system reflector at a position farther from the first optical axis than the parabola optical system reflector, an angle of incidence to the projection lens of light reflected by the projector optical system reflector can be made smaller. For this reason, a simple design for the projection lens is possible.

The projector optical system reflector may be disposed at a position farther from the projection lens than the parabola optical system reflector in the direction of the first optical axis. According to this aspect, a space where light is reflected from the projector optical system reflector and reaches the projection lens can also be utilized, for example, as a space where light is radiated from the second light source and reaches the parabola optical system reflector. Therefore, the overall size of the lamp unit can be more easily suppressed compared to when the projector optical system reflector is disposed at a position that is closer to the projection lens than the parabola optical system reflector.

The first semiconductor light-emitting element may be disposed at a position farther from the projection lens than the second semiconductor light-emitting element in the direction of the first optical axis. According to this aspect, in comparison to disposing the first semiconductor light-emitting element at a position closer to the projection lens than the second semiconductor light-emitting element, more radiated light from the first light source can be radiated to the projector optical system reflector. In addition, more radiated light from the second light source can also be radiated to the parabola optical system reflector. Therefore, it is possible to utilize light radiated from the light sources with greater efficiency.

According to one or more embodiments of the present invention, a lamp unit can be provided that combines a projector optical system and a parabola optical system while suppressing an overall size.

Other aspects and advantages of the invention will be apparent from the following description, the drawings and the claims.

DETAILED DESCRIPTION

Embodiments of the present invention will be described in detail below with reference to the drawings.

Figure 1:
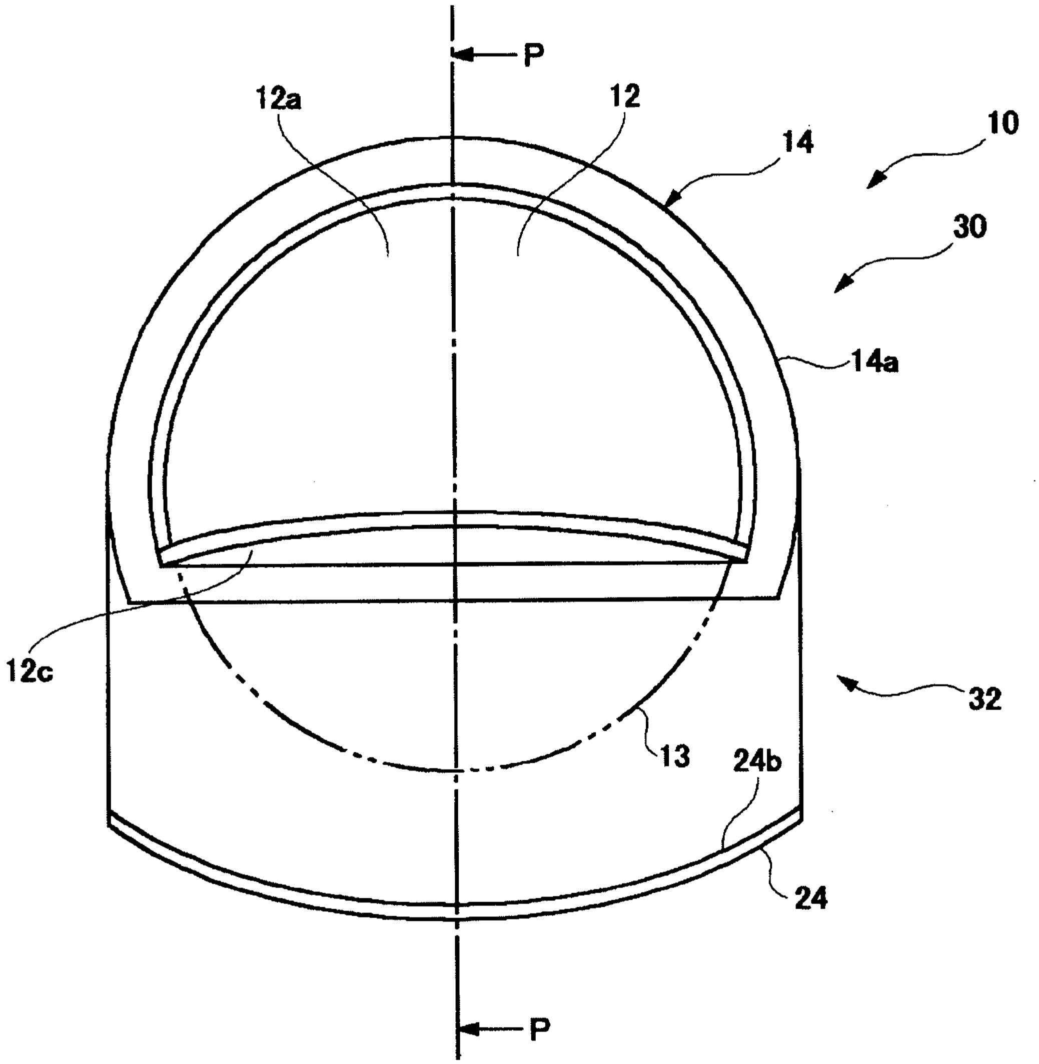
FIG. 1 is a frontal view of a lamp unit according to an embodiment.
Figure 2:
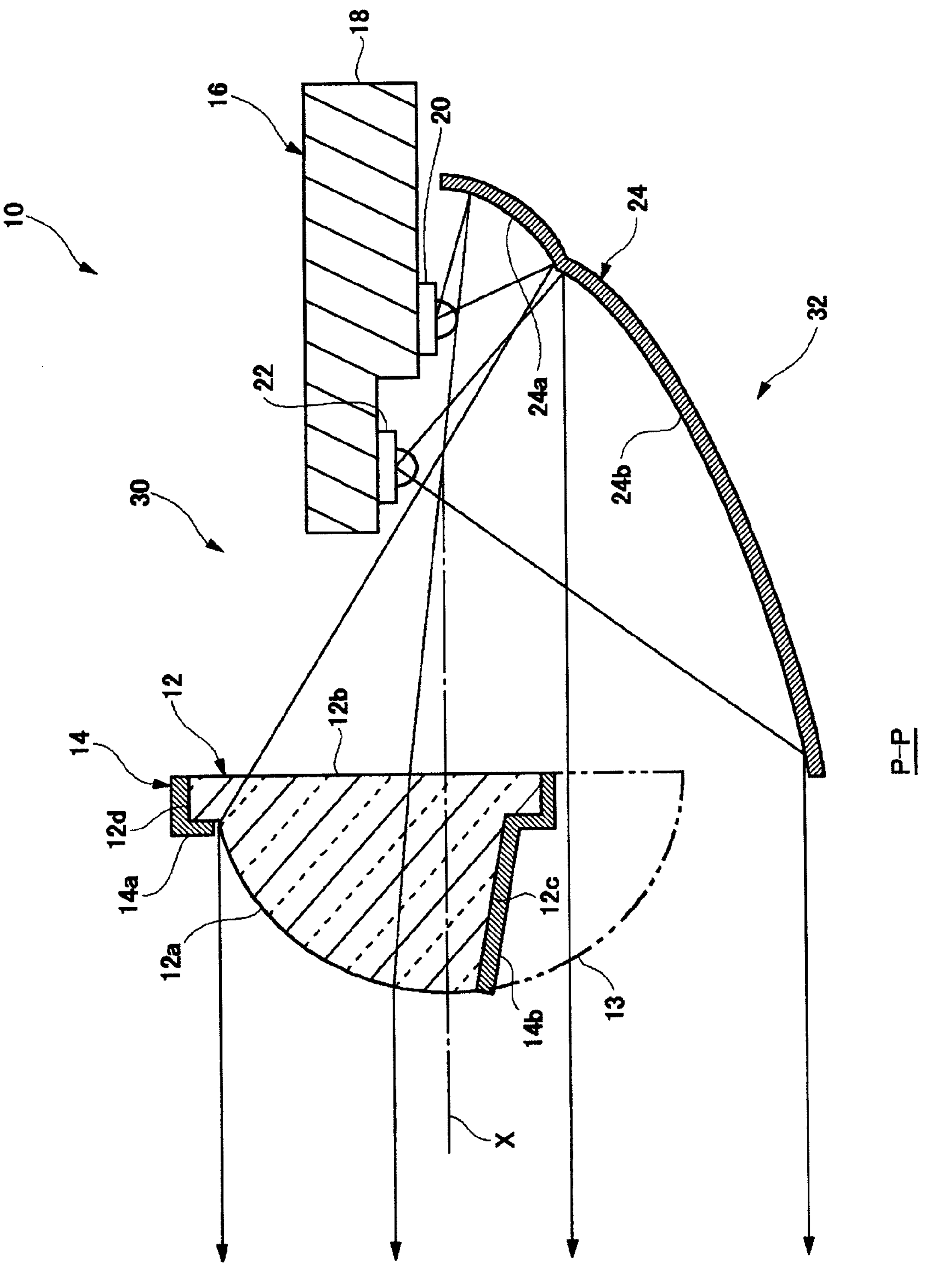
FIG. 2 is a cross-sectional view taken along a line P-P in FIG. 1.

FIG. 1 is a frontal view of a lamp unit 10 according to an embodiment, and FIG. 2 is a cross-sectional view taken along a line P-P in FIG. 1. A detailed description of a configuration of the lamp unit 10 will be given below in relation to both FIGS. 1 and 2.

The lamp unit 10 of the present embodiment is used as a headlamp that is mounted in a vehicle such as an automobile. The lamp unit 10 is respectively provided as a right headlamp disposed on the right side and a left headlamp disposed on the left side at the front of the vehicle. In such case, a plurality of lamp units 10 may be provided for both the right headlamp and the left headlamp.

The lamp unit 10 includes a projection lens 12, a holder 14, a light source unit 16, and a composite reflector 24. The projection lens 12 is formed by a plane convex aspherical lens having a convex front-side face and a flat rear-side face. The convex face on the front side is referred to as an exit surface 12*a* below, and the plane face on the rear side is referred to as an incident face 12*b*. The projection lens 12 projects an inverted image of a light source image that is formed on a rear-side focal plane thereof ahead of the lamp. The following description uses a projected image that is formed on a virtual vertical screen disposed at a position 25 meters ahead of the vehicle as a reference. Also, note that the virtual plane on which the projection image is formed is obviously not limited to the vertical plane above and, for example, a horizontal plane that assumes a road surface is also acceptable.

The projection lens 12 has a shape in which a lower portion is cut away by a plane, leaving a first optical axis X thereof. A plane formed by cutting away the projection lens 12 in this manner is designated as a paraxial outer peripheral portion 12*c*. In FIG. 1, a lens-omitted location 13 is indicated as a part that was cut away and removed from the original projection lens, with the projection lens having a circular outer shape when seen in the direction of the first optical axis X.

The paraxial outer peripheral portion 12*c* thus formed is closer to the first optical axis X than another outer peripheral portion as seen in the direction of the first optical axis X. The projection lens 12 is provided with a flange portion 12*d* on the outer periphery of the incident face 12*b* side. The flange portion 12*d* is also provided on the outer periphery of the incident face 12*b* side of the paraxial outer peripheral portion 12*c*.

The holder 14 includes a flange holding portion 14*a* and a plane supporting portion 14*b*. The flange holding portion 14*a* includes an inner face that has the same shape as an outer face of the flange portion 12*d*, and holds the flange portion 12*d* to support the projection lens 12. The plane supporting portion 14*b* includes a plane portion that has the same shape as the paraxial outer peripheral portion 12*c*, and abuts the paraxial outer peripheral portion 12*c* to support the projection lens 12. The inner faces of the flange holding portion 14*a* and the plane supporting portion 14*b* are both subjected to surface treatments that suppress light reflection.

The light source unit 16 includes a heat sink 18, a first light source element 20, and a second light source element 22. The heat sink 18 is formed using material with good radiation performance, such as aluminum material. The heat sink 18 is arranged behind the projection lens 12 and above the first optical axis X.

Both the first light source element 20 and the second light source element 22 include a light-emitting chip (not shown) and a thin film. The light-emitting chip is formed by a white light-emitting diode, which is a semiconductor light-emitting element that includes a square light-emitting surface that measures approximately one square millimeter. The light-emitting chip is obviously not limited by this particular specification, and may be any other element-like light source with planar light emission in a general dot configuration, such as a laser diode, for example. The thin film is provided so as to cover the light-emitting surface of the light-emitting chip. In the present embodiment, the thin film is formed into a hemispherical shape for both the first light source element 20 and the second light source element 22.

The first light source element 20 is attached generally central in the direction of the first optical axis X to the lower face of the heat sink 18. The first light source element 20 is arranged such that the light-emitting chip inside is positioned on the first optical axis X.

The lower face of the heat sink 18 is provided with a step that is cut away in the upward direction at a location closer to the projection lens 12 than a location at which the first light-emitting element 20 is attached. The second light-emitting element 22 is attached to this stepped portion among the lower face of the heat sink 18 and, thus, arranged above the first light-emitting element 20. The second light-emitting element 22 is arranged vertically above the first optical axis X, similar to the first light-emitting element 20.

The composite reflector 24 includes a projector optical system reflector 24*a* and a parabola optical system reflector 24*b*. The inner face of the projector optical system reflector 24*a* is formed such that a cross section thereof configures part of an ellipse. The projector optical system reflector 24*a* is arranged such that an elliptical focal point is positioned at a layout location of the light-emitting chip of the first light source element 20, and another elliptical focal point is positioned in front of the first light source element 20 on the first optical axis X. The projector optical system reflector 24*a* reflects light radiated from the first light source element 20 toward the incident face 12*b* of the projection lens 12. The projection lens 12 allows light reflected by the projector optical system reflector 24*a* to pass through and forms a light distribution pattern on the virtual vertical screen using light radiated from the first light source element 20. An optical system configured by the first light source element 20, the projector optical system reflector 24*a*, and the projection lens 12 will be referred to below as a projector optical system 30.

The parabola optical system reflector 24*b* is integratedly formed with the projector optical system reflector 24*a* so as to extend further forward and downward from a front-bottom end portion of the projector optical system reflector 24*a*. The inner face of the parabola optical system reflector 24*b* reflects light radiated from the second light source element 22 forward unchanged and forms a light distribution pattern on the virtual vertical screen using light radiated from the second light source element 22. An optical system configured by the second light source element 22 and the parabola optical system reflector 24*b* will be referred to below as a parabola optical system 32.

The parabola optical system reflector 24*b* reflects light radiated from the second light source element 22 such that the reflected light passes through a space adjacent to the paraxial outer peripheral portion 12*c* of the projection lens 12. That is, the parabola optical system reflector 24*b* reflects light reflected from the second light source element 22 so as to pass through the lens-omitted location 13. The light path of the parabola optical system can thus approach the optical axis of the projection lens more closely than the light path of a parabola optical system that utilizes the vicinity of a projection lens without the lens-omitted location 13. Therefore, the parabola optical system reflector 24*b* can more closely approach the first optical axis X, and the overall size of the lamp unit 10 can be suppressed.

As shown in FIGS. 1 and 2, the projector optical system reflector 24*a* and the parabola optical system reflector 24*b* are both arranged below the first optical axis X. Consequently, the first light source element 20 and the second light source element 22 are attached to the lower face of the heat sink 18 in order to radiate light respectively toward the projector optical system reflector 24*a* and the parabola optical system reflector 24*b*.

Thus, by attaching the first light source element 20 and the second light source element 22 facing in the same direction to a face among the outer face of the heat sink 18, more parts that can be used for radiation can be provided on the heat sink 18 than when these light source elements face in mutually different directions and are respectively attached to the outer face. Therefore, the radiation efficiency of the heat sink 18 can be improved, and fluctuations in the luminosity of light radiated by the first light source element 20 and the second light source element 22 that are caused by temperature increases can be suppressed.

In addition, by attaching the first light source element 20 and the second light source element 22 to the lower face of the heat sink 18 in this manner, heat generated by the light source elements is more prone to escape to the heat sink 18 above. Therefore, as compared to attaching the light source elements to another outer face, the radiation efficiency of the heat sink 18 can be further improved.

Obviously, the layout locations of the projector optical system reflector 24*a* and the parabola optical system reflector 24*b* are not limited to below the first optical axis X, and the layout locations of the first light source element 20 and the second light source element 22 on the heat sink 18 are not limited to the lower face of the heat sink 18. For example, instead of below the first optical axis X, the projector optical system reflector 24*a* and the parabola optical system reflector 24*b* may be arranged at a position in the same peripheral direction as the paraxial outer peripheral portion 12*c* with respect to the first optical axis X. In such case, the first light source element 20 and the second light source element 22 may be attached to an outer face of the heat sink 18 that faces the projector optical system reflector 24*a* and the parabola optical system reflector 24*b*.

Also, as described above, the projector optical system reflector 24*a* is disposed at a position closer to the first optical axis X than the parabola optical system reflector 24*b*. Thus, as compared to disposing the projector optical system reflector 24*a* at a position farther from the first optical axis X than the parabola optical system reflector 24*b*, an angle of incidence to the projection lens 12 of light reflected by the projector optical system reflector 24*a* can be made smaller. For this reason, a simple design for the projection lens 12 is possible.

Also, the projector optical system reflector 24*a* is disposed at a position that is farther from the projection lens 12 than the parabola optical system reflector 24*b* in the direction of the first optical axis X. The first light source element 20 is disposed at a position that is farther from the projection lens 12 than the second light source element 22 in the direction of the first optical axis X. Accordingly, a space through which light reflected from the projector optical system reflector 24*a* to the projection lens 12 passes can be utilized as a path of reflected light from the second light source element 22 toward the parabola optical system reflector 24*b*. Therefore, the overall size of the lamp unit 10 can be suppressed.

It should be noted that, as described above, a step is provided on the lower face of the heat sink 18 and the second light source element 22 is disposed on the upper stepped portion so that the second light source 22 is arranged above the first light source element 20. Consequently, the path of reflected light from the projector optical system reflector 24*a* to the projection lens 12 can be directed below the second light source element 22.

Figure 3:
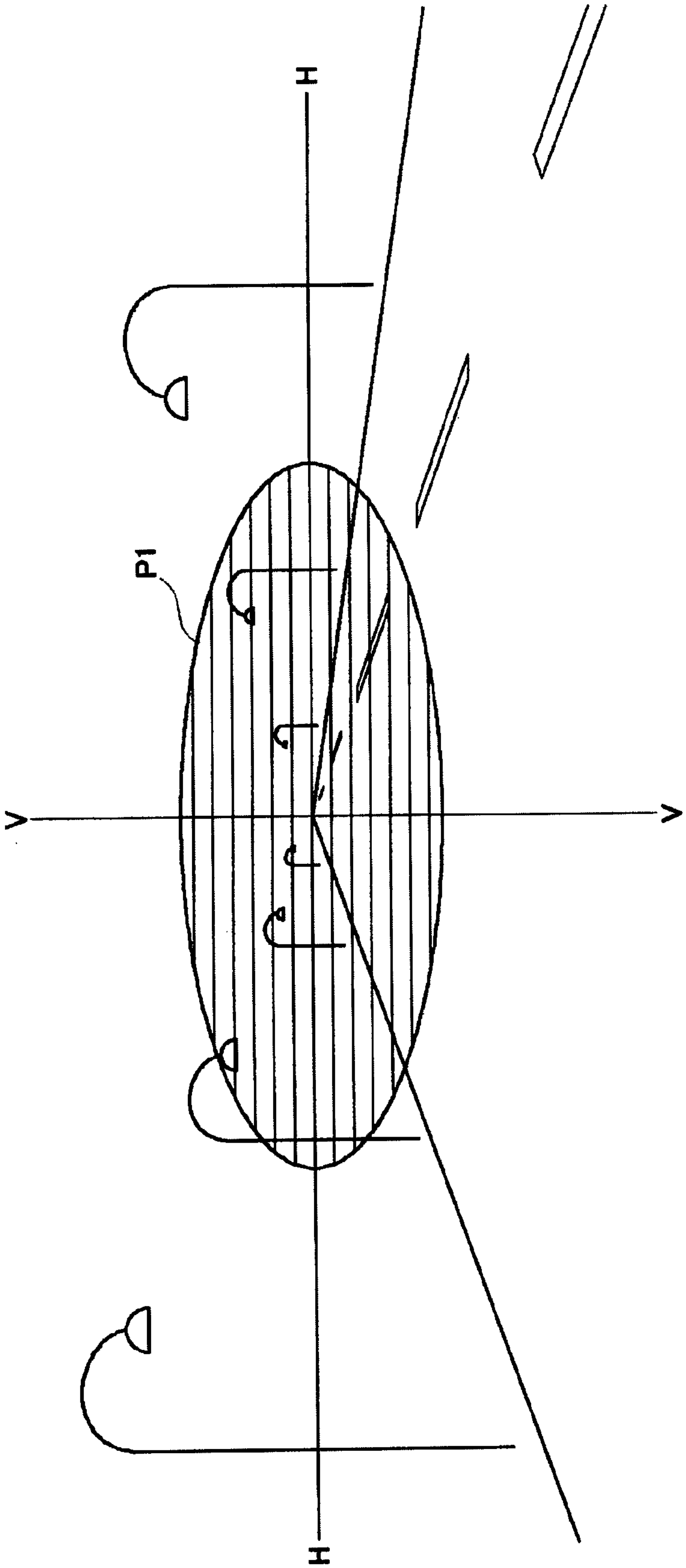
FIG. 3 is a view showing a first light distribution pattern formed by a projector optical system of the lamp unit according to the present embodiment.

FIG. 3 is a view showing a first light distribution pattern P1 formed by the projector optical system 30 of the lamp unit 10 according to the present embodiment. The first light distribution pattern P1 is formed by overlapping light radiated from the projector optical systems 30 of the lamp units 10 respectively mounted in the right headlamp and the left headlamp. However, a plurality of lamp units 10 may also be provided for both the right headlamp and the left headlamp as mentioned above. In such case, the projector optical system 30 in each of the plurality of lamp units 10 may form mutually different portions among the first light distribution pattern P1, whereby the first light distribution pattern P1 may be thus formed overall by the plurality of lamp units 10. As shown in FIG. 3, the projector optical system 30 of the lamp unit 10 forms the first light distribution pattern P1 having an elliptical shape that extends in the horizontal direction and is centered on a point H-V that is an intersection of the line H-H and the line V-V, i.e., a vanishing point ahead of the lamp unit 10.

Figure 4:
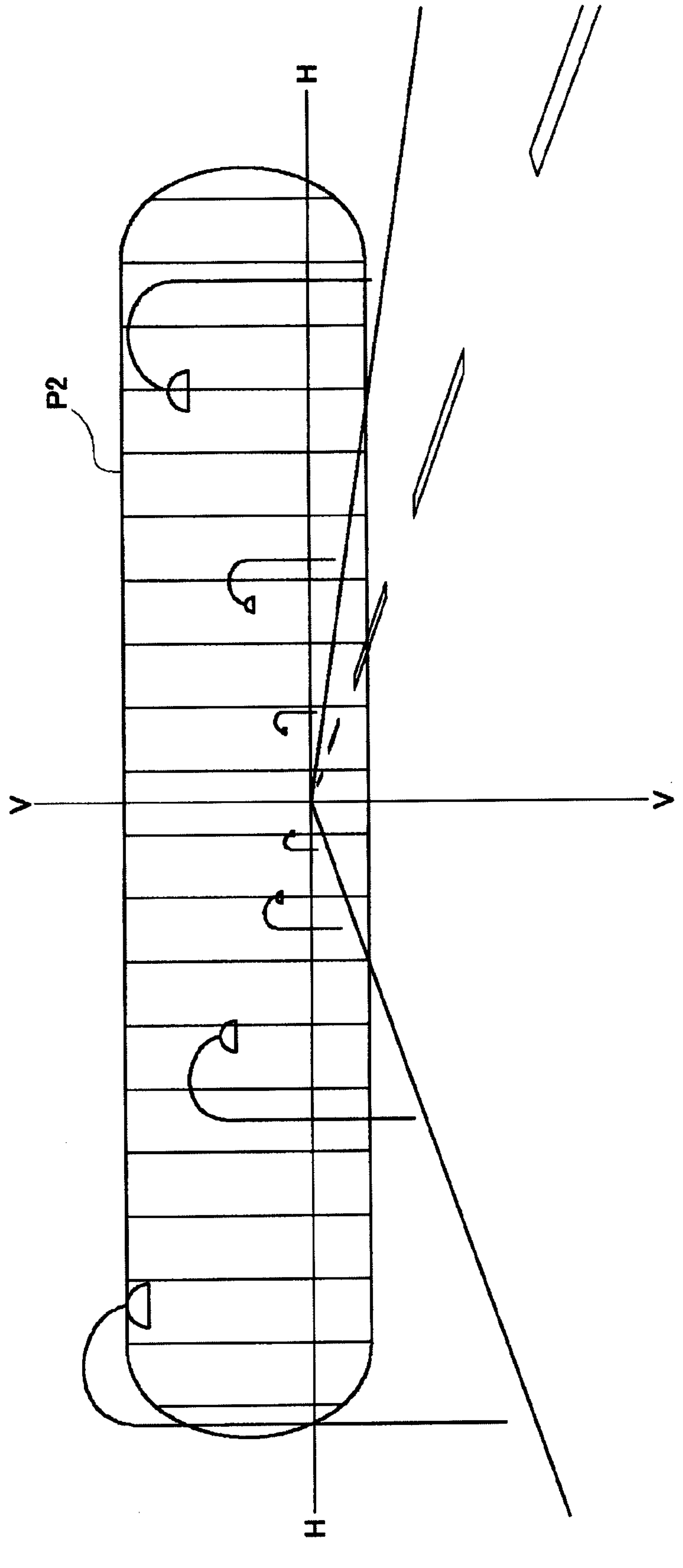
FIG. 4 is a view showing a second light distribution pattern formed by a parabola optical system of the lamp unit according to the present embodiment.

FIG. 4 is a view showing a second light distribution pattern P2 formed by the parabola optical system 32 of the lamp unit 10 according to the present embodiment. The second light distribution pattern P2 is formed by overlapping light radiated from the parabola optical systems 32 of the lamp units 10 respectively mounted in the right headlamp and the left headlamp. However, a plurality of lamp units 10 may also be provided for both the right headlamp and the left headlamp as mentioned above. In such case, the parabola optical system 32 in each of the plurality of lamp units 10 may form mutually different portions among the second light distribution pattern P2, whereby the second light distribution pattern P2 may be thus formed overall by the plurality of lamp units 10.

As FIG. 4 illustrates, the parabola optical system 32 of the lamp unit 10 forms the second light distribution pattern P2 having an elliptical shape that extends parallel to the line H-H and whose height remains generally the same. The second light distribution pattern P2 is formed such that a region above the line H-H extends wider than a region below the line H-H.

Figure 5:
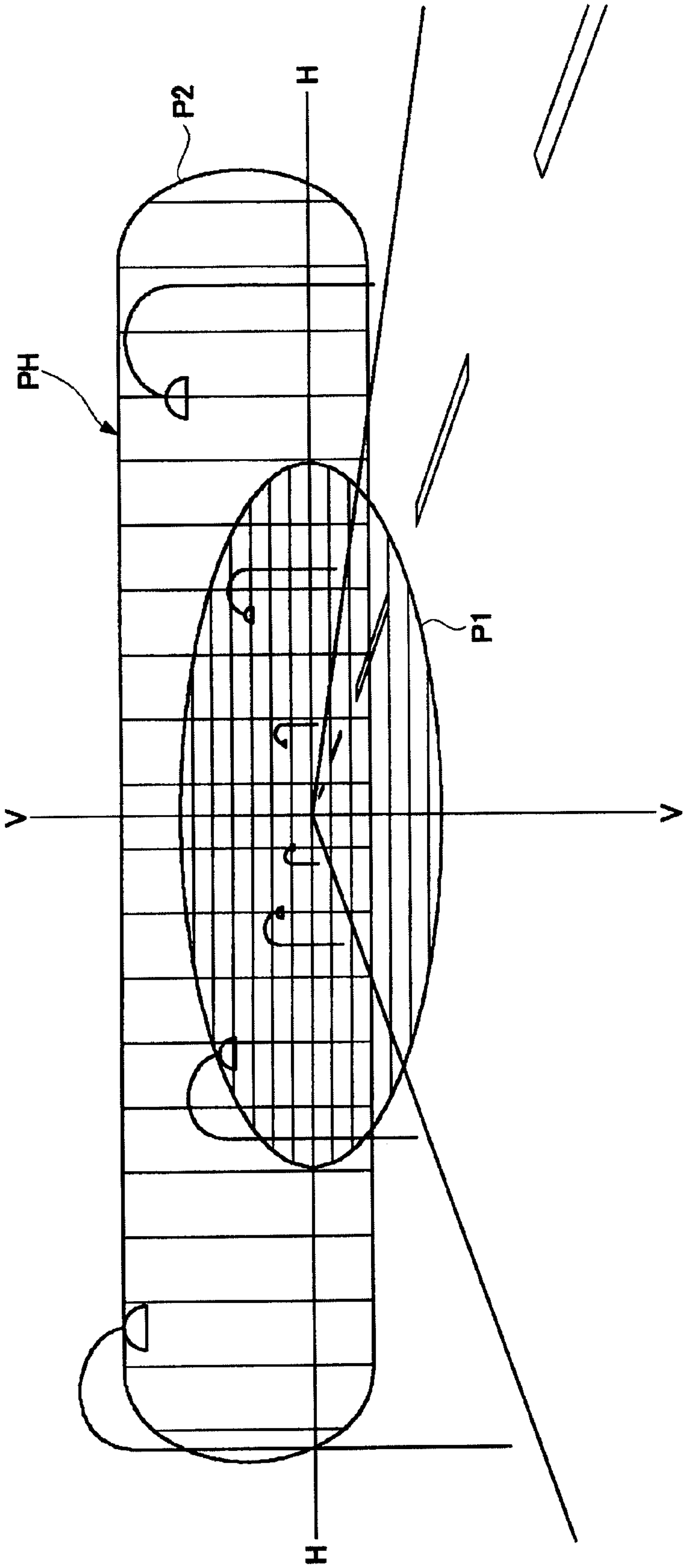
FIG. 5 is a view showing a high-beam distribution pattern formed by the lamp unit according to the present embodiment.

FIG. 5 is a view showing a high-beam distribution pattern PH formed by the lamp unit 10 according to the present embodiment. The high-beam distribution pattern PH is formed by overlapping both the first light distribution pattern P1 and the second light distribution pattern P2. Accordingly, the projector optical system 30 that forms the first light distribution pattern P1 and the parabola optical system 32 that forms the second light distribution pattern P2 function as low-beam light sources that together form the high-beam distribution pattern PH. In such case, the first light distribution pattern P1 and the second light distribution pattern P2 partially overlap with each other to form the high-beam distribution pattern PH.

The second light distribution pattern P2 extends longer in the horizontal direction than the first light distribution pattern P1. In addition, the second light distribution pattern P2 is formed up to a position higher than the first light distribution pattern P1 with respect to the line H-H. Meanwhile, the first light distribution pattern P1 is formed up to a position lower than the second light distribution pattern P2 with respect to the line H-H. Accordingly, the first light distribution pattern P1 and the second light distribution pattern P2 overlap in the vicinity of the point H-V.

Overlapping the first light distribution pattern P1 and the second light distribution pattern P2 in this manner to form the high-beam distribution pattern PH enables the radiation of strong light in the vicinity of the point H-V, which improves visibility over a long distance ahead of the vehicle.

The projector optical system is capable of well forming a light distribution pattern that generally condenses light more than the parabola optical system. Meanwhile, the parabola optical system is capable of well forming a light distribution pattern that generally diffuses light more than the projector optical system. In the lamp unit 10 according to the present embodiment, the projector optical system 30 thus condenses light to form the first light distribution pattern P1 in the vicinity of the point H-V. The parabola optical system 32 also radiates diffused light to form the second light distribution pattern P2 over a wide range so as to supplement the periphery of the first light distribution pattern P1. Accordingly, the respective characteristics of the projector optical system and the parabola optical system can be exploited to suitably form the high-beam distribution pattern PH.

The present invention is not limited to the embodiments described above, and any configuration that suitably combines the elements of these embodiments is also a valid embodiment of the present invention. In addition, various modifications such as design changes based on the knowledge of persons having ordinary skill in the art may be added to the embodiments, and embodiments with such added modifications are also included in the scope of the present invention. An example of such a modification is given below.

In an example of a modification, the lamp unit 10 is disposed in proximity to the front-right end portion and the front-left end portion of the vehicle or in proximity to the rear-right end portion or the rear-left end portion of the vehicle, and functions as a vehicle clearance lamp, that is, a side marker lamp. In this case as well, the projector optical system 30 condenses light in the vicinity of the point H-V to form a light distribution pattern, and the parabola optical system 32 radiates diffused light to form a light distribution pattern over a wide range so as to supplement the periphery of the light distribution pattern formed by the projector optical system 30. Visibility from a position far ahead of or far behind a vehicle can thus be improved, and the vehicle width and following distance can be more accurately recognized by the driver of a vehicle ahead, such as an oncoming vehicle or a preceding vehicle, and by the driver of a following vehicle.

In an example of a modification, the lamp unit 10 is disposed at the vehicle front or rear portion, and functions as a daytime running lamp (DRL), that is, a daytime lamp, of the vehicle. In this case as well, the projector optical system 30 condenses light in the vicinity of the point H-V to form a light distribution pattern, and the parabola optical system 32 radiates diffused light to form a light distribution pattern over a wide range so as to supplement the periphery of the light distribution pattern formed by the projector optical system 30. Therefore, during the daytime the host vehicle can be more accurately recognized by the driver of a preceding or following vehicle.

In an example of a modification, the lamp unit 10 is disposed at the vehicle front portion. The first light source element 20 and the second light source element 22 in the lamp unit 10 include infrared LEDs that radiate infrared rays, whereby the lamp unit 10 functions as an infrared (IR) lamp unit. Therefore, the existence and positions of pedestrians and the like can be detected while suppressing glare directed at a preceding vehicle at night. The detection of the existence and positions of pedestrians and the like by radiating infrared rays ahead of the vehicle is common knowledge and will not be described here.

In an example of a modification, the lamp unit 10 forms a so-called low-beam distribution pattern. In this case as well, the projector optical system 30 forms a cut-off line in the vicinity of the line H-H and forms a light distribution pattern that includes a hot zone, i.e., a region of high light intensity. The parabola optical system 32 forms a light distribution pattern that extends farther below and longer in the horizontal direction than the light distribution pattern formed by the projector optical system 30 so as to supplement the right, left and lower regions of the light distribution pattern formed by the projector optical system 30.

It is difficult to dispose a shade for forming a cut-off line in the lamp unit 10 illustrated in FIGS. 1 and 2, because light radiated by the second light source element 22 passes in the vicinity of a rear focal point of the projection lens 12. Therefore, the projector optical system reflector **24*a* and the parabola optical system reflector 24*b* may be separated. The second light source element 22 and the parabola optical system reflector 24*b* may be arranged behind the first light source element 20 and the projector optical system reflector 24*a*, i.e., arranged separated from the projection lens 12. Accordingly, it is possible to avoid having light radiated from the second light source element 22 pass in the vicinity of the rear focal point of the projection lens 12, and a shade can be disposed in the vicinity of the rear focal point of the projection lens 12**.

In an example of a modification, the projector optical system of the lamp unit 10 forms a low-beam distribution pattern instead of the first light distribution pattern P1. In addition, the parabola optical system of the lamp unit 10 forms a light distribution pattern different from this low-beam distribution pattern so as to supplement the periphery of the low-beam distribution pattern. In such case, the parabola optical system of the lamp unit 10 may form a so-called high-beam distribution pattern. According to this mode as well, light radiation that exploits the characteristics of both the projector optical system and the parabola optical system can be achieved.

While description has been made in connection with exemplary embodiments of the present invention, it will be obvious to those skilled in the art that various changes and modification may be made therein without departing from the present invention. It is aimed, therefore, to cover in the appended claims all such changes and modifications falling within the true spirit and scope of the present invention.

DESCRIPTION OF THE REFERENCE NUMERALS

10 LAMP UNIT
12 PROJECTION LENS
**12*a*** EXIT FACE
**12*b*** INCIDENT FACE
**12*c*** PARAXIAL OUTER PERIPHERAL PORTION
13 LENS-OMITTED LOCATION
14 HOLDER
16 LIGHT SOURCE UNIT
18 HEAT SINK
20 FIRST LIGHT SOURCE ELEMENT
22 SECOND LIGHT SOURCE ELEMENT
24 COMPOSITE REFLECTOR
**24*a*** PROJECTOR OPTICAL SYSTEM REFLECTOR
**24*b*** PARABOLA OPTICAL SYSTEM REFLECTOR

What is claimed is:

1. A lamp unit comprising:

a first light source;

a projection lens that forms a light distribution pattern using light radiated from the first light source;

a second light source; and a parabola optical system reflector that reflects light radiated from the second light source, wherein the projection lens comprises a paraxial outer peripheral portion that is closer to a first optical axis than at least part of another outer peripheral portion as seen in the direction of the first optical axis, and wherein the parabola optical system reflector reflects light radiated from the second light source such that the reflected light passes through a space adjacent to the paraxial outer peripheral portion and exits the lamp unit without passing through a lens.

2. A lamp unit comprising:

a first light source;

a projection lens that forms a light distribution pattern using light radiated from the first light source;

a second light source; and a parabola optical system reflector that reflects light radiated from the second light source, wherein the projection lens comprises a paraxial outer peripheral portion that is closer to a first optical axis than at least part of another outer peripheral portion as seen in the direction of the first optical axis, wherein the parabola optical system reflector reflects light radiated from the second light source such that the reflected light passes through a space adjacent to the paraxial outer peripheral portion, and wherein the lamp unit further comprises:

a projector optical system reflector that reflects light radiated from the first light source toward the projection lens; and a heat sink, wherein the first light source comprises a first semiconductor light-emitting element, wherein the second light source comprises a second semiconductor light-emitting element, wherein the parabola optical system reflector and an entirety of the projection optical system reflector are disposed at a position in the same peripheral direction as the paraxial outer peripheral portion with respect to the first optical axis, and wherein the first semiconductor light-emitting element and the second semiconductor light-emitting element are attached to an outer face of the heat sink that faces one of the parabola optical system reflector and the projector optical system reflector.

3. The lamp unit according to claim 2, wherein the projector optical system reflector is disposed at a position closer to the first optical axis than the parabola optical system reflector.

4. The lamp unit according to claim 3, wherein the projector optical system reflector is disposed at a position farther from the projection lens than the parabola optical system reflector in the direction of the first optical axis.

5. The lamp unit according to claim 4, wherein the first semiconductor light-emitting element is disposed at a position farther from the projection lens than the second semiconductor light-emitting element in the direction of the first optical axis.

6. A method of manufacturing a lamp unit comprising:

configuring a projection lens to form a light distribution pattern using light radiated from a first light source;

configuring a parabola optical system reflector to reflect light radiated from a second light source, wherein the projection lens has a paraxial outer peripheral portion that is closer to a first optical axis than at least part of another outer peripheral portion as seen in the direction of the first optical axis, and wherein the parabola optical system reflector reflects light radiated from the second light source such that the reflected light passes through a space adjacent to the paraxial outer peripheral portion and exits the lamp unit without passing through a lens.

7. The method of manufacturing a lamp unit according to claim 6, wherein the first light source comprises a first semiconductor light-emitting element, and wherein the second light source comprises a second semiconductor light-emitting element, the method further comprising:

configuring a projector optical system reflector to reflect light radiated from the first light source toward the projection lens;

disposing the parabola optical system reflector and an entirety of the projection optical system reflector at a position in the same peripheral direction as the paraxial outer peripheral portion with respect to the first optical axis; and attaching the first semiconductor light-emitting element and the second semiconductor light-emitting element to an outer face of a heat sink that faces one of the parabola optical system reflector and the projector optical system reflector.

8. The method of manufacturing a lamp unit according to claim 7 further comprising: disposing the projector optical system reflector at a position closer to the first optical axis than the parabola optical system reflector.

9. The method of manufacturing a lamp unit according to claim 8, disposing the projector optical system reflector at a position farther from the projection lens than the parabola optical system reflector in the direction of the first optical axis.

10. The method of manufacturing a lamp unit according to claim 9, disposing the first semiconductor light-emitting element at a position farther from the projection lens than the second semiconductor light-emitting element in the direction of the first optical axis.

* * * * *